INVENTORS
Douglas J. Wing &
BY Bernard G. Mazurek, Jr.

Albert F. Duke
ATTORNEY

United States Patent Office 3,560,920
Patented Feb. 2, 1971

3,560,920
BRAKE SYSTEM FAILURE WARNING CIRCUIT
Douglas J. Wing, St. Clair Shores, and Bernard G. Mazurek, Jr., Taylor, Mich., assignors to General Motors Corporation, Detroit, Mich., a corporation of Delaware
Filed Nov. 29, 1968, Ser. No. 779,913
Int. Cl. B60t 17/22
U.S. Cl. 340—52                    5 Claims

ABSTRACT OF THE DISCLOSURE

A circuit for indicating failure in a hybrid dual braking system including a warning lamp, a normally closed pressure responsive switch and a normally open brake pedal travel responsive switch connected in series across a source of direct current. The normally closed switch responds to the pressure in the rear half of the system and under normal operating conditions will interrupt the circuit to the lamp prior to completion of the circuit through the brake pedal travel responsive switch. Upon loss of pressure to the rear half of the system, the lamp is continuously energized and upon loss of pressure to the front half of the system, the lamp is momentarily energized.

---

This invention relates to circuits for indicating failure of a split or dual brake system and more particularly to a circuit for indicating a hybrid dual brake system failure.

Motor vehicles presently being manufactured are provided with a brake system wherein separate pairs of brake units such as the front brakes and the rear brakes are actuated from separate pressure chambers so that in the event of failure of one half of the system, the other half of the system is available to stop the vehicle. Since failure of one half of the usual dual brake system causes a significant change in brake pedal travel, it has been heretofore proposed to energize a warning light in response to a predetermined brake pedal travel to inform the vehicle operator of the failure of the brake system. Certain dual brake systems, however, incorporate a hybrid brake arrangement wherein one set of wheels, usually the front wheels, employ disc brakes and the other set of wheels employ drum brakes. Since these two types of brakes have different operating characteristics and requirements, the front to rear displacement ratio in the dual master cylinder is not unity and consequently operation of a warning lamp based on merely the attainment of a particular brake pedal travel is not sufficient to inform the operator of a failure in the system.

With the foregoing in mind, it is an object of the present invention to provide an economical warning circuit for indicating failure of a hybrid dual brake system.

It is another object of the present invention to provide a brake system failure warning circuit incorporating a switch which is responsive to pressure in only one half of a dual brake system arranged in series with a brake pedal travel responsive switch to provide an indication of failure of either half of the dual braking system.

It is another object of the present invention to provide a brake system failure warning circuit incorporating pressure responsive and brake pedal travel responsive warning lamp energizing switches, the operation of which may be readily checked by the vehicle operator.

It is another object of the present invention to provide a brake system failure warning circuit incorporating warning lamp energizing switches which are relatively free from sticking due to non-use or erosion due to arcing.

In accordance with a preferred embodiment of the invention, a warning lamp is connected across a source of direct current in series with a normally closed switch and a normally open switch, the former being responsive to the fluid pressure supplied to the rear half of a hybrid dual brake system and the latter being responsive to brake pedal travel. The pressure switch is adapted to open at a fixed pressure which under normal brake system operating conditions would be supplied to the rear brakes prior to travel of the brake pedal sufficiently to close the brake pedal travel responsive switch. Thus, under normal brake system operating conditions the circuit through the lamp is broken either by the normally open brake pedal travel responsive switch or by opening of the normally closed pressure responsive switch when the brakes are applied. However, upon failure of the rear brake system, the pressure responsive switch will not open and consequently closure of the brake pedal travel responsive switch will complete a circuit through the warning lamp. Moreover, because of the increased pedal travel associated with loss of pressure to the front disc brakes, the lamp will be momentarily energized upon such an occurrence both upon actuation and release of the brake pedal. The operator is thus informed of loss of pressure to either half of the dual system and is also informed of that half of the system which has lost pressure.

The warning lamp is also connected in series with the usual ignition switch and is adapted to be grounded through the pressure responsive switch whenever the ignition switch is placed in a start position to provide an indication to the vehicle operator of a defective switch or lamp.

A more complete understanding of the present invention may be had from the following detailed description which should be read in conjunction with the drawings in which.

Figure 1:
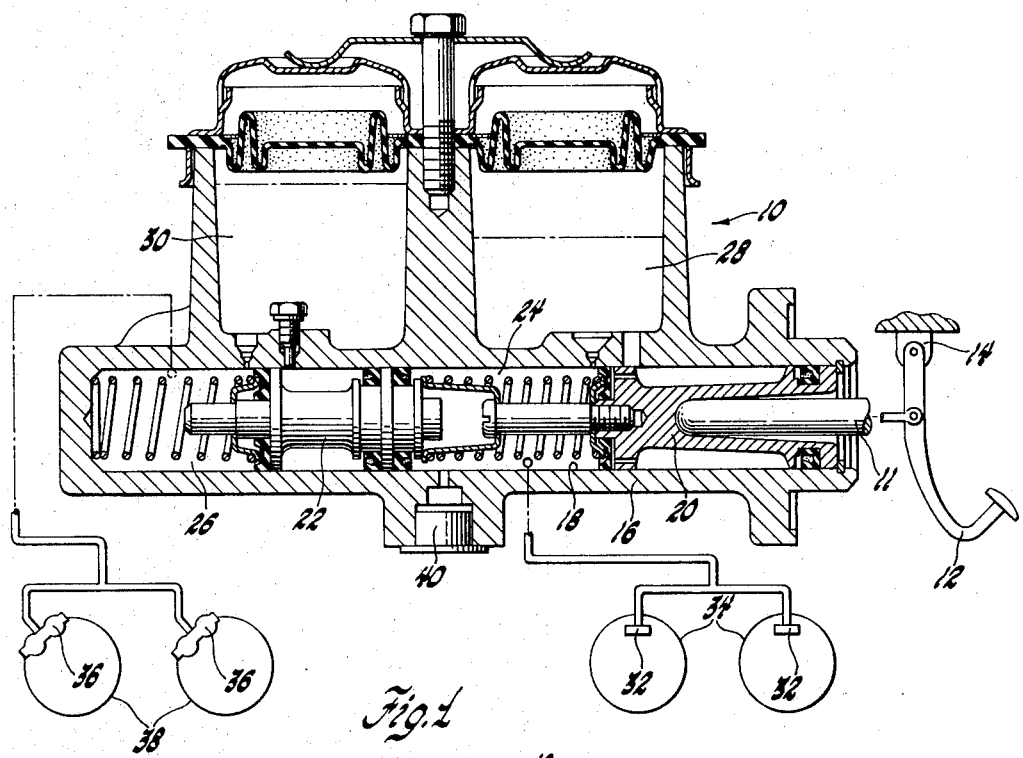
FIG. 1 is a sectional view of a typical dual hydraulic master cylinder, a typical braking arrangement being diagrammatically illustrated and shows a preferred location for the pressure switch forming a part of the present invention.

Referring now to the drawings, and initially to FIG. 1, a hybrid dual braking system for a motor vehicle is depicted. By hybrid is meant a system in which one set of wheels employs disc brakes while the other set of wheels employs drum brakes. As shown in FIG. 1, a dual master cylinder generally designated 10 is illustrated as being actuable through a push rod 11 by a brake pedal 12 which is pivotally supported by a fixed portion 14 of the vehicle. The master cylinder 10 has a housing 16 in which is formed a bore 18 containing primary and secondary pressurizing pistons 20 and 22 and forming suitable brake fluid pressurizing chambers 24 and 26. The housing 16 is also formed to provide a brake fluid reservoir 28 connected through suitable compensating ports with chamber 24 and a brake fluid reservoir 30 connected through a suitable compensating port with chamber 26.

Pressurizing chamber 24 is illustrated as being fluid connected to wheel cylinders 32 of a wheel brake assembly 34. The brake assembly 34 is schematically illustrated as being drum brakes and in the embodiment shown in FIG. 1 are the rear brakes of the vehicle. Pressurizing chamber 26 is illustrated as being fluid connected to wheel cylinders 36 of a wheel brake assembly 38. The brake assembly 38 is illustrated as being disc brakes and in the embodiment shown in FIG. 1 are the front brakes of the vehicle.

As is well known in the art, in dual brake systems having front disc brakes and rear drum brakes, the volume of fluid displaced from chamber 26 is usually on the order of three times the volume of fluid displaced from chamber 24. Thus, while there is a determinable amount of travel of the pedal 12 associated with loss of pressure in either or both of the chambers 24 and 26, there is no single lower limit of pedal travel indicative of loss of pressure to either half of the brake system under all stopping conditions. For example, pedal travel indicative of loss of pressure to the rear brakes under low deceleration stopping conditions could be exceeded under high deceleration stopping conditions without loss of pressure to either the front or rear brakes.

Figure 2:
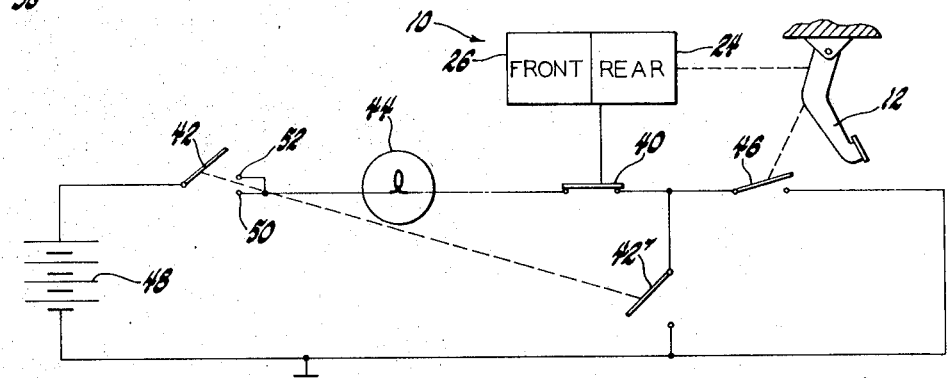
FIG. 2 is a schematic diagram of one embodiment of the brake system failure warning circuit of the present invention.

In accordance with the present invention, a normally closed pressure switch 40 is mounted in the housing 16 and communicates with the chamber 24 so as to respond to the pressure in the chamber 24. As shown in FIG. 2, the pressure switch 40 is connected in series with a normally open ignition switch 42, an indicator lamp 44, and a normally open brake pedal travel switch 46 across a source of direct current 48 which may be the usual vehicle battery. The ignition switch 42 is movable to a start position indicated at 50 and will return to the run position indicated at 52 in the usual manner. In both the run and start positions, the lamp 44 is connected across the battery through the switches 40 and 46. However, in the start position 50, the switch 46 is shunted by a portion of the ignition switch 42 indicated by the switch 42' which grounds the lamp 44 through the switch 40.

The switch 40 is adapted to open at a predetermined pressure in the chamber 24 while the switch 46 is adapted to close after a predetermined amount of travel of the brake pedal 12. For example, the switch 40 may open at 60 p.s.i. pressure in the chamber 24 while the switch 46 may close after 1½ inches of brake pedal travel. It will be understood, of course, that these values are given by way of example only and are not intended to limit the invention. The primary requirement in this regard is that under normal operating conditions, i.e., when both the front and rear brake systems are intact the pressure buildup in the chamber 24 by actuation of the brake pedal 12 will cause the switch 40 to open before the switch 46 closes. That is to say, the switches 40 and 46 are designed to respectively open and close upon depression of the brake pedal 12 so that closure of the switch 46 prior to opening of the switch 40 is indicative of loss of pressure to the rear cylinders 32. Once the switch 46 closes, further travel of the brake pedal 12 will merely maintain the switch 46 in a closed circuit condition.

The operation of the system shown in FIG. 2 is as follows: Under normal brake pressure conditions and with the ignition switch in the run position 52, movement of the brake pedal 12 will build up pressure in the chamber 24 sufficient to open the switch 40 prior to closure of the switch 46. Thus, the lamp 44 will not be energized. If a failure in the rear wheel assembly 34 occurs, the pressure buildup in the chamber 24 will not occur prior to movement of the brake pedal 12 a distance sufficient to close the switch 46. Consequently, the switch 40 will remain closed and the lamp 44 will be energized. If a failure in the front wheel assembly 38 occurs, the pressure buildup in the chamber 24 will not occur until after the piston 22 has bottomed out which requires a substantially larger travel of the pedal 12 than that required to close the switch 46. Consequently, the lamp 44 will be energized. As soon as the piston 22 bottoms out, pressure in the chamber 24 will build up sufficiently to open the switch 40 and deenergize the lamp 44. Similarly, when the brake pedal 12 is released, pressure in the chamber 24 will drop very quickly, reclosing the switch 40 before the switch 46 has opened so that the lamp is once again momentarily energized. Thus, loss of pressure to the front wheel assembly 38 results in a momentary energization of the lamp 44 whereas loss of pressure to the rear wheel assembly 34 results in a constant energization of the lamp 44 for the entire period that the brake pedal 12 is depressed.

Figure 3:
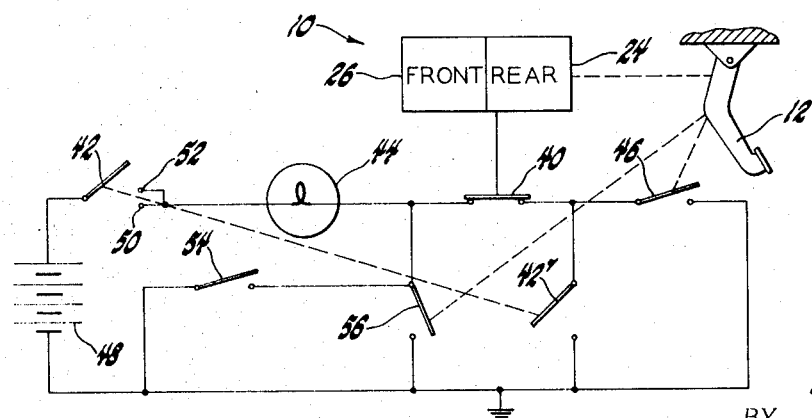
FIG. 3 is a schematic diagram of another embodiment of the brake system failure warning circuit of the present invention.

Referring now to FIG. 3, a modified form of the invention is shown which differs from that shown in FIG. 2 in the addition of a normally open brake fluid level switch 54 and a second brake pedal travel responsive switch 56. The switches 54 and 56 are connected in parallel with each other and in series with the lamp 44. The switch 54 is adapted to close when the fluid in the master cylinder reservoir drops below a predetermined level and may be of the type shown and described in the patent to Wing 3,368,046 assigned to the assignee of the present invention. The switch 56 is similar to the switch 46 but is adapted to close in response to the significantly larger amount of travel of the brake pedal 12 which occurs upon loss of pressure to the front brake assembly 38. Thus, upon closure of either the switch 54 or the switch 56, the lamp 44 is energized to indicate to the driver a low brake fluid level or loss of pressure to the front brake assembly 38.

In addition to providing an indication of failure in a hybrid dual braking system, the switching arrangement of the present invention permits the switches 40 and 46 to be actuated each time the brakes are applied thus insuring against the possibility of the switches 40 and 46 sticking as a result of non-use. Nor are the contacts of the switches 40 and 46 likely to erode due to arcing since they are required to conduct an electrical current only when a failure occurs. Moreover, the circuit proposed indicates an inadequately bled or improperly adjusted brake system inasmuch as under these circumstances the switch 46 will close before the switch 40 opens indicating to the driver that the brake system should be checked either for leakage in the system or for adjustment of the brakes.

As previously indicated, the switch 42' closes when the ignition switch 42 is in the start position 50. Thus, when the vehicle is being started, with the brake pedal 12 released, the lamp 44 should light. Conversely, when the vehicle is being started with the brakes applied, the lamp 44 should not light. If the lamp 44 is not energized or deenergized under the aforementioned circumstances, the operator is informed that either one of the switches 40 or 46 or the lamp 44 is defective.

It should be understood that the above description and drawings are presented as the preferred embodiment and are not intended as limitations since obvious modifications will occur to persons skilled in the art.

We claim:

1. In a motor vehicle provided with a hybrid dual braking system and a brake pedal for actuating said system, a warning circuit for indicating failure of the rear half of said system comprising a source of direct current, indicator means, a normally closed pressure switch and a normally open brake pedal travel responsive switch connected in series across said source, said pressure switch being responsive to the pressure to the rear half of said system and adapted to open the circuit to said lamp in response to the application of a predetermined fluid pressure to said rear half of said system, said normally open switch being adapted to close subsequent to the movement of said brake pedal to a predetermined position normally sufficient to attain said predetermined pressure whereby said indicator means is energized upon failure of said rear half of said braking system.

2. In a motor vehicle provided with front disc brakes and rear drum brakes and a dual master cylinder for supplying fluid under pressure to said brakes in response to actuation of the vehicle brake pedal, a warning circuit for indicating loss of pressure to either said front or rear brakes and comprising a source of direct current, a series circuit connected across said source and including ignition switch means, an indicator lamp, a normally closed pressure switch and a normally open brake pedal travel responsive switch, said normally closed pressure switch being adapted to open upon the attainment of a predetermined pressure to the rear brakes, said normally open switch being adapted to close subsequent to movement of said brake pedal to a position sufficient under normal operating conditions to attain said predetermined pressure whereby said lamp is continuously energized during actuation of said brake pedal upon loss of pressure to said rear brakes and is momentarily energized during actuation of said brake pedal upon loss of pressure to said front brakes.

3. In a motor vehicle provided with front disc brakes and rear drum brakes and a dual master cylinder for supplying fluid under pressure to said brakes in response to actuation of the vehicle brake pedal, a warning circuit for indicating loss of pressure to either said front or rear brakes and comprising a source of direct current, a series circuit connected across said source and including ignition switch means, an indicator lamp, a normally closed pressure switch and a normally open brake pedal travel responsive switch, said ignition switch means has a run and a start position and includes contact means for grounding said lamp through said pressure switch when said ignition switch is in said start position for providing an indication of the condition of said lamp and said pressure switch, said normally closed pressure switch being adapted to open upon the attainment of a predetermined pressure to the rear brakes, said normally open switch being adapted to close subsequent to movement of said brake pedal to a position sufficient under normal operating conditions to attain said predetermined pressure whereby said lamp is continuously energized during actuation of said brake pedal upon loss of pressure to said rear brakes and is momentarily energized during actuation of said brake pedal upon loss of pressure to said front brakes.

4. In a motor vehicle provided with front disc brakes and rear drum brakes and a dual master cylinder for supplying fluid under pressure to said brakes in response to actuation of the vehicle brake pedal, a warning circuit for indicating loss of pressure to either said front or rear brakes and comprising a source of direct current, a series circuit connected across said source and including ignition switch means, an indicator lamp, a normally closed pressure switch and a normally open brake pedal travel responsive switch, said normally closed pressure switch being adapted to open upon the attainment of a predetermined pressure to the rear brakes, said normally open switch being adapted to close subsequent to movement of said brake pedal to a position sufficient under normal operating conditions to attain said predetermined pressure, a normally open brake fluid level responsive switch connected in parallel with said pressure switch and said brake pedal travel responsive switch whereby said lamp is continuously energized during actuation of said brake pedal upon loss of pressure to said rear brakes or decrease in fluid level below a predetermined level and is momentarily energized during actuation of said brake pedal upon loss of pressure to said front brakes.

5. In a motor vehicle provided with front disc brakes and rear drum brakes and a dual master cylinder for supplying fluid under pressure to said brakes in response to actuation of the vehicle brake pedal, a warning circuit comprising a source of direct current, a series circuit connected across said source and including ignition switch means, an indicator lamp, a normally closed pressure switch responsive to the pressure to said rear brakes, a first normally open brake pedal travel responsive switch, said normally closed pressure switch being adapted to open upon the attainment of a predetermined pressure to the rear brakes, said first normally open switch means adapted to close subsequent to movement of said brake pedal to a position sufficient under normal operating conditions to attain said predetermined pressure, a second normally open brake pedal travel responsive switch connected in parallel with said normally closed switch and said first normally open switch and adapted to close in response to brake pedal travel of a predetermined amount indicative of loss of pressure to said front brakes, a third normally open switch connected in parallel with said second normally open switch and adapted to close in response to a decrease in the fluid level in the reservoir of said dual master cylinder below a predetermined level whereby said lamp is energized to indicate loss of fluid level or loss of pressure to said front or said rear brakes.

References Cited
UNITED STATES PATENTS

| | | | |
|---|---|---|---|
| 3,384,885 | 5/1968 | Forbush | 340—59 |
| 3,439,323 | 4/1969 | Kersting | 340—52C |
| 3,448,579 | 6/1969 | Reznicek | 340—52C |

DONALD J. YUSKO, Primary Examiner

H. S. COHEN, Assistant Examiner

U.S. Cl. X.R.

340—60